US011320533B2

(12) United States Patent
Coppi et al.

(10) Patent No.: US 11,320,533 B2
(45) Date of Patent: May 3, 2022

(54) METHOD AND APPARATUS FOR MONITORING SURFACE DEFORMATIONS OF A SCENARIO

(71) Applicant: IDS GEORADAR S.r.l., Milan (IT)

(72) Inventors: Francesco Coppi, Calcinaia (IT); Alberto Michelini, Pisa (IT)

(73) Assignee: IDS GEORADAR S.R.L., Milan (IT)

( * ) Notice: Subject to any disclaimer, the term of this patent is extended or adjusted under 35 U.S.C. 154(b) by 393 days.

(21) Appl. No.: 16/462,684

(22) PCT Filed: Dec. 15, 2017

(86) PCT No.: PCT/IB2017/058020
§ 371 (c)(1),
(2) Date: May 21, 2019

(87) PCT Pub. No.: WO2018/109745
PCT Pub. Date: Jun. 21, 2018

(65) Prior Publication Data
US 2021/0286071 A1    Sep. 16, 2021

(30) Foreign Application Priority Data
Dec. 15, 2016  (IT) .......................... 102016000127152

(51) Int. Cl.
*G01S 13/90*    (2006.01)
(52) U.S. Cl.
CPC ...... *G01S 13/9023* (2013.01); *G01S 13/9082* (2019.05)
(58) Field of Classification Search
CPC .......................... G01S 13/9023; G01S 13/9082
See application file for complete search history.

(56) References Cited

U.S. PATENT DOCUMENTS

| 4,922,254 A | * | 5/1990 | Schuessler | ............ | G01S 13/904 342/25 F |
| 5,659,318 A | * | 8/1997 | Madsen | .............. | G01S 13/9023 342/156 |

(Continued)

OTHER PUBLICATIONS

International Search Report, dated Feb. 21, 2018, corresponding to International Application No. PCT/IB2017/058020.
(Continued)

*Primary Examiner* — Erin F Heard
*Assistant Examiner* — Juliana Cross
(74) *Attorney, Agent, or Firm* — Ladas & Parry LLP; Malcolm J. MacDonald (57) ABSTRACT

A method for monitoring surface deformations of a scenario by means of differential interferometry technique, including the steps of prearranging a radar sensor having a transmitting antenna and a receiving antenna arranged to transmit and acquire radar signals, the radar sensor arranged to move along a planar trajectory γ having centre O; defining a reference system S having origin in the centre O; acquiring by SAR technique the scenario by means of handling the radar sensor along the planar trajectory γ, the radar sensor being configured so that the radiation pattern of the antennas is oriented radially with respect to the centre O, the acquisition occurring at points of acquisition $s_i$ arranged on the trajectory γ, the three-dimensional position of each target point $t_i$ being definable by means of spherical coordinates $(\rho_i, \theta_i, \beta_i)$.

15 Claims, 8 Drawing Sheets

(56) References Cited

U.S. PATENT DOCUMENTS

| | | | | |
|---|---|---|---|---|
| 6,549,159 | B1* | 4/2003 | Wolframm | G01S 13/9092 342/25 R |
| 6,741,202 | B1* | 5/2004 | Krikorian | G01S 13/9092 342/25 C |
| 8,159,387 | B1* | 4/2012 | Fernandez | G01S 15/46 342/146 |
| 9,354,308 | B1* | 5/2016 | Conquest | G01S 13/9023 |
| 9,864,054 | B2* | 1/2018 | Liu | G01S 13/904 |
| 9,958,526 | B2* | 5/2018 | Kumar | G01S 5/0273 |
| 9,971,031 | B2* | 5/2018 | Liu | G01S 13/904 |
| 10,823,843 | B1* | 11/2020 | Kendra | G01S 13/589 |
| 2003/0122700 | A1* | 7/2003 | Moreira | G01S 13/9043 342/25 R |
| 2005/0128126 | A1* | 6/2005 | Wolframm | G01S 13/9023 342/25 R |
| 2008/0074313 | A1* | 3/2008 | Willey | G01S 13/87 342/25 R |
| 2011/0248882 | A1* | 10/2011 | Coppi | G01S 13/32 342/156 |
| 2014/0285375 | A1* | 9/2014 | Crain | G01S 13/865 342/25 A |
| 2015/0185317 | A1* | 7/2015 | Braun | G01S 13/5242 342/80 |
| 2016/0320479 | A1* | 11/2016 | Ma | G01S 13/9023 |
| 2018/0081051 | A1* | 3/2018 | Michelini | G01S 13/878 |
| 2018/0224541 | A1* | 8/2018 | Pieraccini | G01S 13/904 |
| 2019/0101639 | A1* | 4/2019 | Rincon | H01Q 21/065 |

OTHER PUBLICATIONS

Pieraccini, M., et al.: "ArcSAR for detecting target elevation"; Electronics Let, IEE Stevenage, GB, vol. 52, No. 18, Sep. 2, 2016 (Sep. 2, 2016), pp. 1559-1560, XP006058155.

Rudolf, H., et al.: "Combination of linear and circular SAR far 3-D features", Geoscience and Remote Sensing, 1997; IGARSS '97, Remote Sensing—A Scientific Vision for Sustainable Oevelopment, 1997, IEEE International Singapore Aug. 3-8 I, New York, NY, USA, IEEE, US, vol. 4, Aug. 3, 1997 (Aug. 3, 1997), pp. 1551-1553, XP010234505.

Nico, G., et al.: "Ground-Based SAR Interferometry for Terrain Mapping: Theory and Sensitivity Analysis", IEEE Transactions on Geoscience Ano Remote Sensing, IEEE Service Center, Piscataway, NJ, US, vol. 42, No. 6, Jun. 1, 2004 (Jun. 1, 2004), pp. 1344-1350, XP011113851.

Ponce, Octavio, et al.: "Multiple-input multiple-output circular SAR", 2014 15th International Radar Symposium (IRS), Warsaw University of Technology (WUT), Jun. 16, 2014 (Jun. 16, 2014), pp. I-5, XP032626962.

Pieraccini, Massimiliano, etal: "ArcSAR: Theory, Simulations, and Experimental Verification", IEEE Transactions on Microwave Theory and Techniques, vol. 65: Issue 1, Jan. 2017, pp. 1-9.

Pieraccini, Massimiliano, et al: "ArcSAR: Theory, Simulations, and Experimental Verification", IEEE Transactions on Microwave Theory and Techniques, http://ieeexplore.ieee.org/7588999, Oct. 12, 2016.

* cited by examiner

METHOD AND APPARATUS FOR MONITORING SURFACE DEFORMATIONS OF A SCENARIO

FIELD OF THE INVENTION

The present invention relates to the field of radar remote sensing for environmental monitoring.

In particular, the invention relates to the field of monitoring surface deformations of a scenario by means of ground based differential interferometry SAR technique (Synthetic apertures Radar).

DESCRIPTION OF THE PRIOR ART

Interferometry with SAR technology is very useful for monitoring slopes, building facades, dams, bridges and more, for obtaining sub-millimeter precision measurements of land displacements or structures in order to predict possible crashes or damage and enable prevention and recovery methods or, in the worst cases, to ensure the time to clear the area potentially affected by the crash and thereby to guarantee the safety of those who work, live or attend the area.

As well known, the ground based interferometric radar systems SAR provide the handling along a trajectory, normally linear, of a radar sensor that, during movement, emits a signal in the microwave frequency band and coherently demodulates the received signal reflected by the observed scenario and, computing the received signals, thus obtain a two-dimensional image of the observed scenario.

In particular, the two-dimensional image of the observed scenario is obtained by a complex procedure of post-processing, based on Fourier transform and called "focusing", which allows the generation of images at a high spatial resolution.

The SAR technology is combined with the interferometric technique to obtain the information of deformation or displacement of the observed scenario with two-dimensional resolution. In particular, the deformation between two instants of time $t_1$ and $t_2$ is calculated by making the phase difference of $\Delta\varphi$ between the step $\varphi_i$ of the image obtained by means of SAR technique at the instant $t_i$ and the step $\varphi_2$ of the image obtained similarly at the instant $t_2$, where the measured displacement $\Delta d$ corresponds to:

$$\Delta d = -\frac{\lambda}{4\pi}\Delta\varphi$$

where $\Delta\varphi=\varphi_2-\varphi_i$, and $\lambda$ is the wavelength of the transmitted signal.

Ground-based interferometric radar systems are widely used for deformation monitoring. In these systems the interferometric technique is joined to other radar techniques in order to obtain a two-dimensional image of deformation. For example in the system described in EP2392943 the SAR technique linear is used to obtain the horizontal angular resolution $\Delta\phi_0$, applying the following formula:

$$\Delta\phi_0 \cong \frac{\lambda}{2\cdot L}$$

where $\lambda$ is the wavelength of the emitted radiofrequency signal and L is the length of the linear scanning made with a mechanical axis.

The resolution in distance $\Delta R$ is instead obtained by transmitting and receiving a linearly frequency modulated signal (LFMCW) on a range of frequencies B, called band of the transmitted signal, according to the following formula:

$$\Delta R \cong \frac{c}{2\cdot B}$$

The acquisition consists of repetition at regular intervals of LFMCW captures by the radar sensor during linear scanning imposed by the mechanical axis.

The horizontal field of view of such exposed solution is limited by the field of view of the antennas used by the radar sensor that is commonly associated with the mid-power horizontal beam of the antenna. In any case, even in the case of ideal antennas, the field of view may not exceed 180°.

In addition, the angular resolution is not uniform but degrades going away from the direction orthogonal to the scan direction (direction of pointing), according to the following formula:

$$\Delta\phi \cong \frac{\lambda}{2\cdot L\cdot\cos(\phi)} = \frac{\Delta\phi_0}{\cos(\phi)}$$

where $\phi$ is the angle set between the direction considered and the pointing direction; thus at the extreme directions of ±90° the angular resolution diverge to infinity.

For this reason the maximum horizontal realistic field of view, accepting a maximum degradation of the angular resolution of a factor 2, is about 120°.

A possible solution for exceeding this limitation in the field of view and in the non-uniform angular resolution is proposed in "*Arc FMCW SAR and Applications in Ground Monitoring*", *IEEE Transactions on Geoscience and Remote Sensing* (September 2014). In this document SAR technique is replaced with the Arc SAR technique, where the radar sensor emits and receives linearly frequency modulated signals while traveling through a planar trajectory maintaining the radar punted along the radial direction. This way, it is possible to obtain two-dimensional images of the scenario with a theoretical horizontal field of view of 360°.

Unlike the linear SAR technique, the angular resolution of the Arc SAR technique remains constant over the entire 360° field of view.

However, with the Arc SAR technique the resolution starts to degrade if the observed target is not located at the same height of the rotation plane. In particular, the resolution is degraded the higher is the angle of elevation $\beta$ of the target with respect to the rotation plane.

In fact, during the procedure of focusing, following the radar acquisition, the Arc SAR datum is computed adding all the contributes of the received signal until the target is within the half-power beam of the transmitting and receiving antennas, compensating the phase term of angular modulation. However, without knowing the elevation of the target, the standard focus formula assumes that the target is on the rotation plane. This means that a zero-elevation target is ideally focused, but when the elevation angle $\beta$ increases, the resolution degrades proportionally.

In order to overcome this inconvenience, the aforementioned document proposes a method for compensating the degradation effect of the resolution, considering in the focusing procedure an average value $\beta_0$ of elevation of the observed scenario. However, this approach is effective if the observed scenario presents a limited range of elevation angles respect to the reference value so that the degradation is less perceptible. For example, for an average value $\beta_0=15°$, the acceptable range of the elevation angle is between about 10° and 19°. Conversely, in case of scenarios with a large excursion of the elevation angle, resolution degradation can not be solved by this method.

Document "*ArcSAR for detecting target elevation*" (Massimiliano Pieraccini et al.) published on Feb. 9, 2016 a method is described for determining the elevation of a target with respect the rotation plane of the ArcSAR acquisition, by measuring the phase difference between ArcSAR acquisitions performed either at different height or having different radius.

SUMMARY OF THE INVENTION

It is therefore a feature of the present invention to provide a method for monitoring surface deformations of a scenario by means of differential interferometry technique combined to the SAR technique that makes it possible to obtain an angular resolution of the interferometric data acquired better than the prior art, also in case of scenarios characterized by wide range angular of elevation with respect to the plane of rotation.

It is also a feature of the present invention to provide such a method that allows a step of processing the radar data having computational time and costs reduced with respect to the prior art.

It is still a feature of the present invention to provide such a method that allows to carry out an interferometric acquisition radar at different heights of acquisition allowing the three-dimensional reconstruction of the observed scenario.

It is also a feature of the present invention to provide an apparatus for implementing this method.

These and other objects are achieved by a method for monitoring surface deformations of a scenario by means of differential interferometry technique, said method comprising the steps of:

prearranging a radar sensor comprising at least one transmitting antenna and a receiving antenna arranged to transmission and to acquisition of radar signals, said radar sensor arranged to move along a planar trajectory $\gamma$ having centre O;

defining a reference system S having origin in said centre O;

acquiring by SAR technique said scenario by means of handling said radar sensor along said planar trajectory $\gamma$, said radar sensor being configured in such a way that the radiation pattern of said antennas is oriented radially with respect to said centre O, said acquisition occurring at points of acquisition $s_i$ arranged on said trajectory $\gamma$, obtaining a plurality of data for each point of acquisition $s_i$;

defining a plurality of target points $t_i$ of said scenario, the three-dimensional position of each target point $t_i$ being definable by means of spherical coordinates $(\rho_i,\theta_i,\beta_i)$ referring to said reference system S, being known the values of said coordinates $\rho_i$ and $\theta_i$;

whose main feature is that a step is also provided of three-dimensional determining said target points $t_i$ by the steps of:

focusing at a first height of acquisition $h_{\alpha 1}$ each target point $t_i$ with respect to its own position considering a value of $\beta_i$ predetermined and equal to $\beta_0$;

focusing at a second height of acquisition $h_{\alpha 2}\neq h_{\alpha 1}$ each target point $t_i$ with respect to its own position considering a value of $\beta_i$ predetermined and equal to $\beta_0$;

controlling by means of interferometric technique said focusings at the height of acquisition $h_{\alpha 1}$ and $h_{\alpha 2}$ obtaining the value of said coordinate $\beta_i$ for each target point;

and that a step is further provided of global focusing each target point $t_i$ with respect to its own three-dimensional position definable by said spherical coordinates $(\rho_i,\theta_i,\beta_i)$, obtaining a first focused radar datum, said step of focusing being obtained, for each target point $t_i$, by analyzing data obtained at each point of acquisition $s_i$ wherein said target point $t_i$ is detectable.

This way, by the present invention, it is possible to obtain a focusing at a resolution of the plurality of target points much higher with respect to the prior art, since each point is focused to its own actual elevation with respect to the plane that contains the planar trajectory $\gamma$. This avoids then the effect of "bulging" typical of targets that are not focused on their elevational but on a very distant predetermined elevation.

In particular, said at least a transmitting antenna and a receiving antenna arranged to transmission and to acquisition of a signal by means of linear frequency modulation technique.

Advantageously, said points of acquisition $s_i$ arranged on said trajectory $\gamma$ are equidistant to each other at an angular distance of n degrees.

In particular, downstream of said step of global focusing, is provided a reiteration of said steps of:

acquiring by means of SAR technique said scenario;

global focusing each target point $t_i$, obtaining a second focused radar datum;

and where a step is then provided of comparing said first and second focused datum by means of differential interferometry technique, in order to monitor the variation of said scenario and to measure its deformation.

This allows the comparison on which the scenario deformation analysis is based.

Advantageously, downstream of said step of three-dimensional determining of said target points $t_i$ a step is provided of simplifying said plurality of target points $t_i$ of said scenario, said step of simplifying providing the steps of:

selecting, in said plurality of target points $t_i$, target points $t_i$ having identical values of $\theta_i$, obtaining a subgroup of said target points $t_i$;

arranging target points $t_i$ in said subgroup for increasing values of $\rho_1$, obtaining an ordered succession of target points $t_i$ of said subgroup;

attributing a same value of $\beta_i$ to target points $t_i$ of said subgroup selected by means of isotonic regression technique according to said ordered succession.

This reduces the data computation for the global focusing phase and it also reduces any noise in the three-dimensional mapping of the scenario.

Advantageously, said step of three-dimensional determining of said target points $t_i$ is made by said radar sensor.

In this exemplary embodiment, therefore, the acquisition by means of SAR interferometry technique of the scenario and the step of three-dimensional determining of the target points $t_i$ are made through the same apparatus, in real time and in a way completely independent from the external data acquisition, allowing a high time saving and making the apparatus independent from pre-existing information.

In particular, in this case the step of simplification is made by means of isotonic regression technique weighed according to predetermined parameters, such as amplitude and coherence in detecting the target points.

Advantageously, said step of three-dimensional determining of said target points $t_i$ is made by at least one transmitting antenna and at least two receiving antennas having heights of location, respectively, $h_{t1}$, $h_{r1}$, $h_{r2}$, with $h_{r1} \neq h_{r2}$, said first height of acquisition $h_{\alpha1}$ and said second height of acquisition $h_{\alpha2} \neq h_{\alpha1}$ being function of said heights of location $h_{t1}$, $h_{r1}$, $h_{r2}$ according to the equations:

$$h_{\alpha1} = \frac{h_{t1} + h_{r1}}{2}$$
$$h_{\alpha2} = \frac{h_{t1} + h_{r2}}{2}$$

Alternatively, said step of three-dimensional determining of said target points $t_i$ is made by at least two transmitting antennas and a receiving antenna having heights of location, respectively, $h_{t1}$, $h_{t2}$, $h_{r1}$, with $h_{t1} \neq h_{t2}$, said first height of acquisition $h_{\alpha1}$ and said second height of acquisition $h_{\alpha2} \neq h_{\alpha1}$ being function of said heights of location $h_{t1}$, $h_{t2}$, $h_{r1}$ according to the equations:

$$h_{\alpha1} = \frac{h_{t1} + h_{r1}}{2}$$
$$h_{\alpha2} = \frac{h_{t2} + h_{r1}}{2}$$

In both embodiments described above, acquisition baselines are at heights mediated between the heights of transmitting and receiving antennas.

Alternatively, said radar sensor comprises two transmitting antennas and two receiving antennas having heights of location, respectively, $h_{t1}$, $h_{t2}$ $h_{r1}$, $h_{r2}$, and said step of three-dimensional tracking of said target points $t_i$ furthermore comprises the steps of:
focusing at a third height of acquisition $h_{\alpha3} \neq h_{\alpha2} \neq h_{\alpha1}$ each target point $t_i$ with respect to its own position considering a value of $\beta_i$ predetermined and equal to $\beta_0$;
focusing at a fourth height of acquisition $h_{\alpha4} \neq h_{\alpha3} \neq h_{\alpha2} \neq h_{\alpha1}$ each target point $t_i$ with respect to its own position considering a value of $\beta_i$ predetermined and equal to $\beta_0$;
said heights of acquisition being function of said heights of location $h_{t1}$, $h_{t2}$, $h_{r1}$, $h_{r2}$ according to the equations:

$$h_{\alpha1} = \frac{h_{t1} + h_{r1}}{2}$$
$$h_{\alpha2} = \frac{h_{t1} + h_{r2}}{2}$$
$$h_{\alpha3} = \frac{h_{t2} + h_{r1}}{2}$$
$$h_{\alpha4} = \frac{h_{t2} + h_{r2}}{2}$$

Alternatively, said radar sensor comprises a transmitting antenna and four receiving antennas having heights of location, respectively, $h_{t1}$, $h_{r1}$, $h_{r2}$, $h_{r3}$, $h_{r4}$, with $h_{r1} \neq h_{r2} \neq h_{r3} \neq h_{r4}$, and said step of three-dimensional determining of said target points $t_i$ also comprises the steps of:
focusing at a third height of acquisition $h_{\alpha3} \neq h_{\alpha2} \neq h_{\alpha1}$ each target point $t_i$ with respect to its own position considering a value of $\beta_i$ predetermined and equal to $\beta_0$;
focusing at a fourth height of acquisition $h_{\alpha4} \neq h_{\alpha3} \neq h_{\alpha2} \neq h_{\alpha1}$ each target point $t_i$ with respect to its own position considering a value of $\beta_i$ predetermined and equal to $\beta_0$;
said heights of acquisition being function of said height of location $h_{t1}$, $h_{r1}$, $h_{r2}$, $h_{r3}$, $h_{r4}$ according to the equations:

$$h_{\alpha1} = \frac{h_{t1} + h_{r1}}{2}$$
$$h_{\alpha2} = \frac{h_{t1} + h_{r2}}{2}$$
$$h_{\alpha3} = \frac{h_{t1} + h_{r3}}{2}$$
$$h_{\alpha4} = \frac{h_{t1} + h_{r4}}{2}$$

According to another aspect of the invention, a method for monitoring surface deformations of a scenario by means of differential interferometry technique comprises the steps of:
prearranging a radar sensor comprising at least one transmitting antenna and one receiving antenna arranged to acquisition of radar signals, said radar sensor arranged to move along a planar trajectory γ having centre O;
defining a reference system S having origin in said centre O;
acquiring by SAR technique said scenario by means of handling said radar sensor along said planar trajectory γ, said radar sensor being configured in such a way that the radiation pattern of said antennas is oriented radially with respect to said centre O, said acquisition occurring at points of acquisition $s_i$ arranged on said trajectory γ, obtaining a plurality of data for each point of acquisition $s_i$;
defining a plurality of target points $t_i$ of said scenario, the three-dimensional position of each target point $t_i$ being definable by means of spherical coordinates $(\rho_i, \theta_i, \beta_i)$ referring to said reference system S, being known the values of said coordinates $\rho_i$ and $\theta_i$;
whose main feature is that are also provided the steps of:
acquiring a three-dimensional mapping of said scenario, said mapping comprising a cloud of highlights $\rho_i$ arranged to define a three-dimensional surface Σ superimposable to said scenario, each highlight $\rho_i$ definable by means of spherical coordinates $(\rho_k, \theta_k, \beta_k)$ referring to said reference system S;
three-dimensional determining said target points $t_i$ by means of intersection, for each target point $t_i$, between said three-dimensional surface Σ and the locus of points having the coordinates $\rho_i$ and $\theta_i$ of said target point $t_i$, obtaining a value of $\beta_i$ for each target point $t_i$;
global focusing each target point $t_i$ with respect to its own three-dimensional position definable by said spherical coordinates $(\rho_i, \theta_i, \beta_i)$, said step of focusing being obtained, for each target point by analyzing data obtained at each point of acquisition $s_i$ wherein said target point $t_i$ is detectable.

According to a further aspect of the invention, an apparatus for monitoring surface deformations of a scenario by means of differential interferometry technique comprises:

a radar sensor comprising at least one transmitting antenna and one receiving antenna arranged to acquisition of radar signals;

a kinematical chain arranged to actuate said radar sensor along a planar trajectory γ having centre O for carrying out an acquisition by means of SAR technique of said scenario, said radar sensor being configured in such a way that the radiation pattern of said antennas is oriented radially with respect to said centre O, said acquisition occurring at points of acquisition $s_i$ arranged on said trajectory γ, obtaining a plurality of data for each point of acquisition $s_i$;

a control unit arranged to provide the steps of:

defining a plurality of target points $t_i$ of said scenario, the three-dimensional position of each target point $t_i$ being definable by means of spherical coordinates $(\rho_i, \theta_i, \beta_i)$ referring to said reference system S, being known the values of said coordinates $\rho_i$ and $\theta_i$, said focusing comprising the steps of:

three-dimensional determining said target points $t_i$ by the steps of:

focusing at a first height of acquisition $h_{\alpha 1}$ each target point $t_i$ with respect to its own position considering a value of $\beta_i$ predetermined and equal to $\beta_0$;

focusing at a second height of acquisition $h_{\alpha 2} \neq h_{\alpha 1}$ each target point $t_i$ with respect to its own position considering a value of $\beta_i$ predetermined and equal to $\beta_0$;

controlling said focusings at the heights of acquisition $h_{\alpha 1}$ and $h_{\alpha 2}$ obtaining a value of said coordinate $\beta_i$ for each target point;

whose main feature is that said control unit is also arranged for carrying out a step of global focusing each target point $t_i$ with respect to its own three-dimensional position definable by said spherical coordinates $(\rho_i, \theta_i, \beta_i)$, said step of focusing being obtained, for each target point $t_i$, by analyzing data obtained at each point of acquisition $s_i$ wherein said target point $t_i$ is detectable.

Advantageously, said radar sensor comprises at least one transmitting antenna and at least two receiving antennas having heights of location, respectively, $h_{t1}$, $h_{r1}$, $h_{r2}$, with $h_{r1} \neq h_{r2}$, said first height of acquisition $h_{\alpha 1}$ and said second height of acquisition $h_{\alpha 2} \neq h_{\alpha 1}$ being function of said heights of location $h_{t1}$, $h_{r1}$, $h_{r2}$ according to the equations:

$$h_{\alpha 1} = \frac{h_{t1} + h_{r1}}{2}$$

$$h_{\alpha 2} = \frac{h_{t1} + h_{r2}}{2}$$

wherein $$\frac{\lambda}{10} < |h_{\alpha 1} - h_{\alpha 2}| < 40\lambda,$$

where λ is the wavelength of the radiofrequency signal emitted by said radar sensor.

Alternatively, said radar sensor comprises at least two transmitting antennas and a receiving antenna having heights of location, respectively, $h_{t1}$, $h_{t2}$, $h_{r1}$, with $h_{t1} \neq h_{t2}$, said first height of acquisition $h_{\alpha 1}$ and said second height of acquisition $h_{\alpha 2} \neq h_{\alpha 1}$ being function of said heights of location $h_{t1}$, $h_{t2}$, $h_{r1}$ according to the equations:

$$h_{\alpha 1} = \frac{h_{t1} + h_{r1}}{2}$$

$$h_{\alpha 2} = \frac{h_{t2} + h_{r1}}{2}$$

wherein $$\frac{\lambda}{10} < |h_{\alpha 1} - h_{\alpha 2}| < 40\lambda,$$

where λ is the wavelength of the radiofrequency signal emitted by said radar sensor.

Alternatively, said radar sensor comprises two transmitting antennas and two receiving antennas having heights of location, respectively, $h_{t1}$, $h_{t2}$, $h_{r1}$, $h_{r2}$, and wherein said step of three-dimensional determining of said target points $t_i$ furthermore comprises the steps of:

focusing at a third height of acquisition $h_{\alpha 3} \neq h_{\alpha 2} \neq h_{\alpha 1}$ each target point $t_i$ with respect to its own position considering a value of $\beta_i$ predetermined and equal to $\beta_0$;

focusing at a fourth height of acquisition $h_{\alpha 4} \neq h_{\alpha 3} \neq h_{\alpha 2} \neq h_{\alpha 1}$ each target point $t_i$ with respect to its own position considering a value of $\beta_i$ predetermined and equal to $\beta_0$;

said heights of acquisition being function of said heights of location $h_{t1}$, $h_{t2}$, $h_{r1}$, $h_{r2}$ according to the equations:

$$h_{\alpha 1} = \frac{h_{t1} + h_{r1}}{2}$$

$$h_{\alpha 2} = \frac{h_{t1} + h_{r2}}{2}$$

$$h_{\alpha 3} = \frac{h_{t2} + h_{r1}}{2}$$

$$h_{\alpha 4} = \frac{h_{t2} + h_{r2}}{2}$$

wherein $|h_{\alpha 1} - h_{\alpha 4}| > |h_{\alpha 2} - h_{\alpha 3}|$.

Such solution has the advantage that the major baseline $B_1 = |h_{\alpha 1} - h_{\alpha 4}|$ allows to improve the accuracy in determining the height by interferometric technique, while the minor baseline $B_2 = |h_{\alpha 2} - h_{\alpha 3}|$ allows to avoid phase ambiguity in determining the height.

In particular, it is possible to set $h_{t1} = h_{r1}$ e $h_{t2} \neq h_{r1}$ e $h_{t2} \neq h_{r2}$.

Alternatively, it is possible to set $h_{t1} = h_{r1}$ e $h_{t2} = h_{r2}$, in such a way to determine two acquisition heights $h_{\alpha 1}$ (equal to $h_{t1} = h_{r1}$) and $h_{\alpha 2}$ (equal to $h_{t2} = h_{r2}$). This makes it possible to have two acquisition heights as in embodiments with three antennas, but with a small footprint with the same values of the acquisition heights $h_{\alpha 1}$ e $h_{\alpha 2}$.

Alternatively, said radar sensor comprises a transmitting antenna and four receiving antennas having heights of location, respectively, $h_{t1}$, $h_{r1}$, $h_{r2}$, $h_{r3}$, $h_{r4}$, with $h_{r1} \neq h_{r2} \neq h_{r3} \neq h_{r4}$, and wherein said step of three-dimensional determining of said target points $t_i$ also comprises the steps of:

focusing at a third height of acquisition $h_{\alpha 3} \neq h_{\alpha 2} \neq h_{\alpha 1}$ each target point $t_i$ with respect to its own position considering a value of $\beta_i$ predetermined and equal to $\beta_0$;

focusing at a fourth height of acquisition $h_{\alpha 4} \neq h_{\alpha 3} \neq h_{\alpha 2} \neq h_{\alpha 1}$ each target point $t_i$ with respect to its own position considering a value of $\beta_i$ predetermined and equal to $\beta_0$;

said heights of acquisition being function of said heights of location $h_{t1}$, $h_{r1}$, $h_{r2}$, $h_{r3}$, $h_{r4}$ according to the equations:

$$h_{a1} = \frac{h_{t1} + h_{r1}}{2}$$

$$h_{a2} = \frac{h_{t1} + h_{r2}}{2}$$

$$h_{a3} = \frac{h_{t1} + h_{r3}}{2}$$

$$h_{a4} = \frac{h_{t1} + h_{r4}}{2}$$

In such embodiment heights $h_{a4} \neq h_{a3} \neq h_{a2} \neq h_{a1}$ can be equidistant with a distance smaller than $\lambda$ or placed so as to have a baseline greater than the other, as in the previous embodiment.

Advantageously, the apparatus further comprises an angular position transducer adapted to provide an angular position of said acquisition points $s_i$ during said acquisition by SAR technique of said scenario by said radar sensor, so as to allow an exact association between each acquisition made and a position of said radar sensor on said planar trajectory $\gamma$ at the time of said acquisition.

In particular, the angular position transducer sends a pulse every hundredth of degree travelled, allowing to locate the radar acquisitions in the 360 degrees of rotation and ensuring the knowledge and repeatability of the acquisition points without the need to make assumptions on the rotation speed of the mechanical arm.

Furthermore, the angular position transducer comprises a trigger which synchronizes the first radar acquisition with the initial position of the antenna. The trigger and the angular position transducer guarantee an angular repeatability better of at least a factor 10 compared to the angular resolution of the radar, which is equal to 0.2°, and they locate with the same level of accuracy the radar acquisitions in 360°.

In this way, the repeatability of the acquisition phase is guaranteed with a very high precision, and therefore the comparability of successive acquisitions is guaranteed too.

Advantageously, the apparatus comprises a power supply module that guarantees the autonomy of powering the entire system even in the absence of external sources. This power supply module can be recharged via solar panels, wind turbine, or diesel generator. The module contains a card that automatically manages the switching on and off of the diesel generator based on the voltage level and the power supplied by the batteries. The power module also includes a radio device (wifi, 3G/4G) to remotely control the system.

Near the radar sensor there is also at least one video camera suitable for taking pictures during the radar acquisition phase. The video camera is also synchronized with the angular position transducer, in order to automatically associate the photos with the respective radar acquisitions.

The radar sensor also includes an inclinometer that detects the pitch and roll of the radar sensor with respect to the horizontal plane. This information is used to determine the inclination of the rotation plane. To do this, two acquisitions of the inclinometer are carried out with mechanical tilt of the sensor at 0°, positioning the mechanical arm in two directions at 90° to each other. By repeating this type of measurement over time it is also possible to give an indication of the setting of the installation over time: a drift of the pitch and roll values of the rotation plane indicates a failure of the installation base of the acquisition module.

BRIEF DESCRIPTION OF THE DRAWINGS

Further characteristic and/or advantages of the present invention are more bright with the following description of an exemplary embodiment thereof, exemplifying but not limitative, with reference to the attached drawings in which.

DESCRIPTION OF SOME PREFERRED EXEMPLARY EMBODIMENTS

Figure 1:
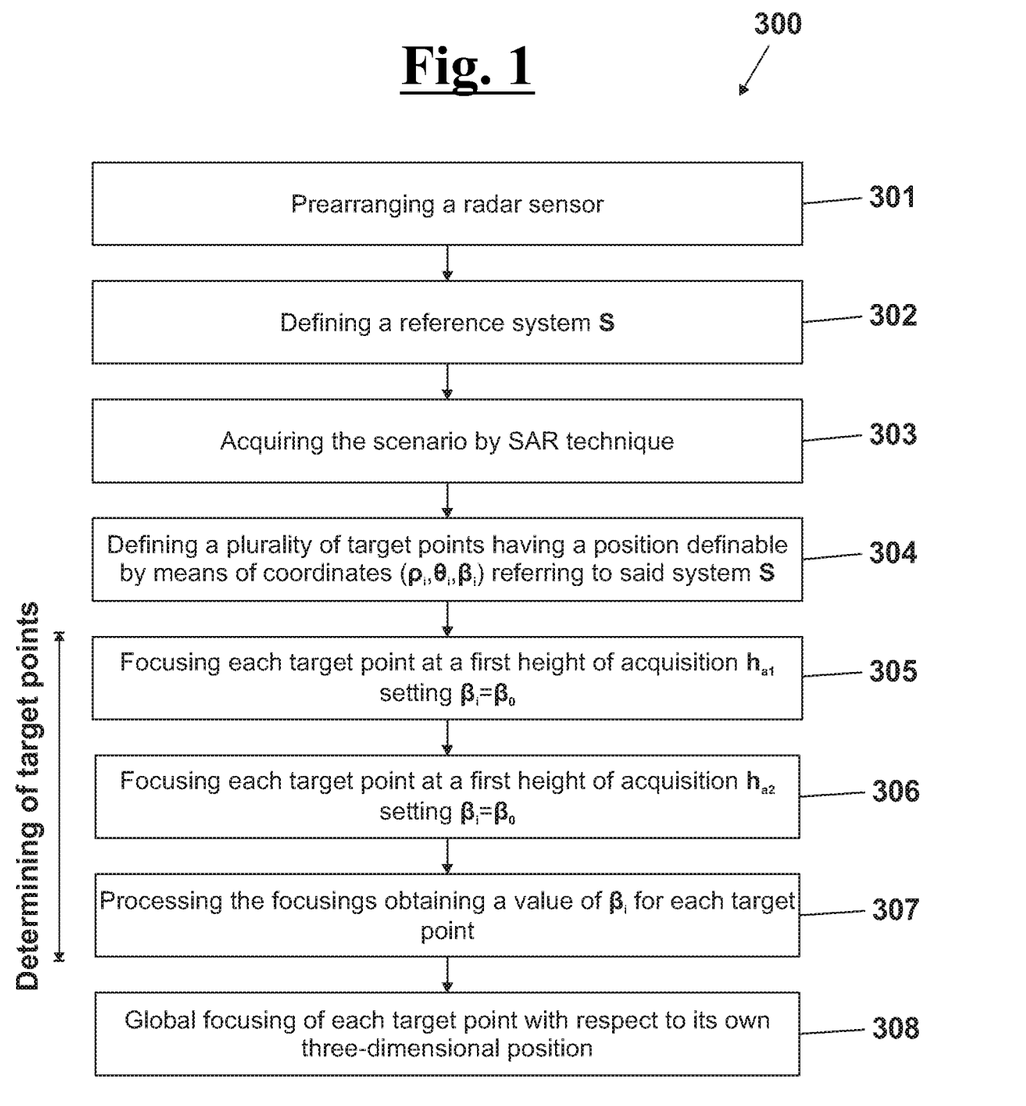
FIG. 1 shows a flowchart of a first method for monitoring surface deformations of a scenario, according to the present invention.

FIG. 1 shows a flowchart 300 where it is diagrammatically shown a method for monitoring surface deformations of a scenario by means of differential interferometry technique, according to the present invention, wherein a first step is provided of prearranging a radar sensor 110 comprising at least one transmitting antenna 111 and one receiving antenna 112 arranged to the transmission and to the acquisition of a signal modulated by means of linear frequency modulation technique, said radar sensor 110 arranged to move along a planar trajectory $\gamma$ having centre O [301].

The method comprise furthermore a step of defining a reference system S having origin in said centre O [302] and a step of acquiring, by SAR technique, the scenario by means of handling the radar sensor 110 along the planar trajectory $\gamma$. In particular, the acquisition is carried out at points of acquisition $s_i$ arranged on the trajectory γ, obtaining a plurality of data for each point of acquisition $s_i$ [303].

A step is then provided of defining a plurality of target points $t_i$ of the scenario. The three-dimensional position of each target point $t_i$ is definable by means of spherical coordinates $ρ_i, θ_i, β_i$ referring to the reference system S, wherein are known the values of the coordinates $ρ_i$ and $θ_i$ [304].

The method then provides a step of three-dimensional determining the target points $t_i$, by means of:

focusing at a first height of acquisition $h_{α1}$ each target point $t_i$ with respect to its own position considering a value of $β_i$ predetermined and equal to $β_0$ [305];

focusing at a second height of acquisition $h_{α2} ≠ h_{α1}$ each target point $t_i$ with respect to its own position considering a value of $β_i$ predetermined and equal to $β_0$ [306];

controlling the above described focusings at the height of acquisition $h_{α1}$ and $h_{α2}$ obtaining a value of the coordinate $β_i$ for each target point [307].

A step is furthermore provided of global focusing each target point $t_i$ with respect to its own three-dimensional position definable by the spherical coordinates $ρ_i, θ_i, β_i$. In particular, this step of focusing is obtained, for each target point $t_i$, by analyzing data obtained at each point of acquisition $s_i$ where the target point $t_i$ is detectable [308].

Figure 2:
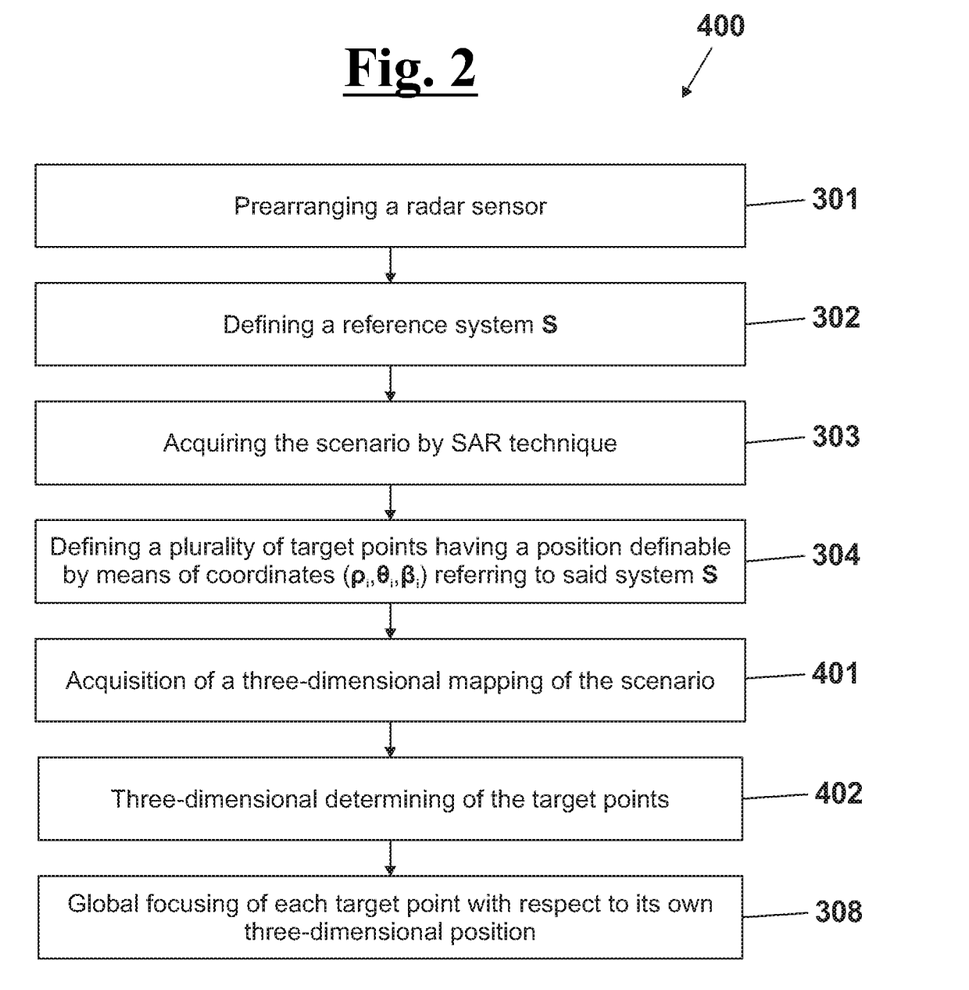
FIG. 2 shows a flowchart of a second method for monitoring surface deformations of a scenario, according to the present invention, wherein an external acquisition of a three-dimensional mapping of the scenario is provided.

In FIG. 2 is present a flowchart 400 where it is diagrammatically shown a method alternative for monitoring surface deformations of a scenario by means of differential interferometry technique, according to the present invention, where the steps [305], [306], [307] of the method shown in the diagram 300 are replaced by the steps [401] and [402].

In particular, the step [401] provides the acquisition of a three-dimensional mapping of the scenario from the outside. The mapping comprises a cloud of highlights $p_i$ arranged to define a three-dimensional surface Σ superimposable to the scenario, each highlight $p_i$ definable by means of spherical coordinates $ρ_k, θ_k, β_k$ referring to the reference system S.

The step [402] provides instead the three-dimensional determining of the target points $t_i$ by means of intersection, for each target point $t_i$, between the three-dimensional surface Σ and the locus of points having the coordinates $ρ_i$ and $θ_i$ of the target point $t_i$ itself, obtaining a value of $β_i$ for each target point $t_i$.

This way, the step of three-dimensional determining the target points $t_i$ is simplified, but at a same time, is dependent to an external acquisition, that is not always available. The exemplary embodiment of FIG. 1, instead, carries out the whole method without the need of an external acquisition, using only the radar sensor 110.

Figure 3:
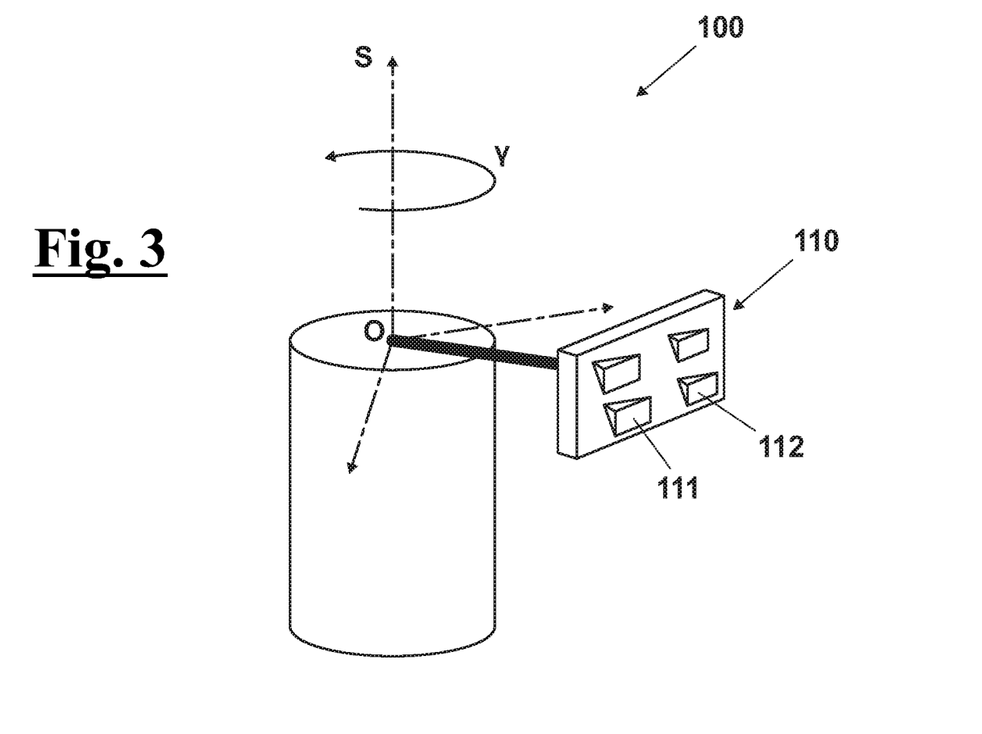
FIG. 3 diagrammatically shows an apparatus for implementing the method according to the present invention, comprising a radar sensor having two transmitting antennas and two receiving antennas.

In FIG. 3 is diagrammatically shown an apparatus 100, designed for implementing the method according to the present invention, comprising a radar sensor 110 having two transmitting antennas 111 and two receiving antennas 112.

Figure 3A:
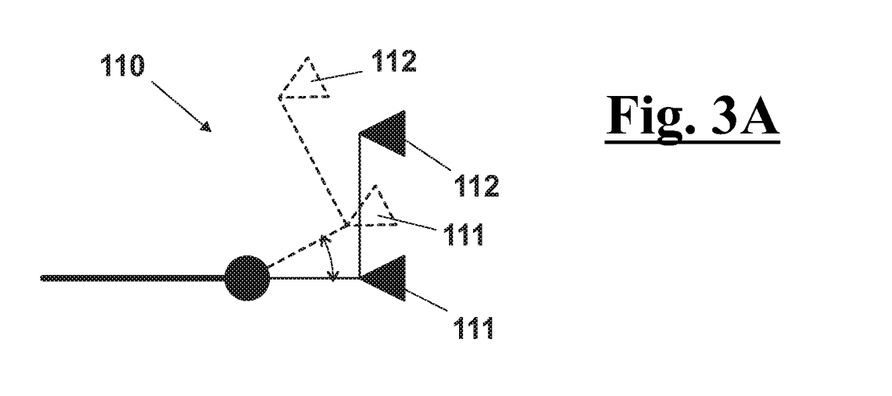
FIG. 3A diagrammatically shows the radar sensor, according to the present invention, during the inclination step.

FIG. 3A shows schematically the radar sensor 110, highlighting the possibility of making a rotation around an axis parallel to the ground, so as to vary the inclination of the antennas.

In general, the difference between two acquisition heights $h_{α1}$ e $h_{α2}$, also called baselines (B=$|h_{α1}−h_{α2}|$) is chosen so as to avoid phase ambiguity in determining the height of the target with respect to the rotation plane by means of the use of the interferometric technique between acquisitions made at different heights. The condition to be respected to avoid phase ambiguity is the following:

$$B = \frac{\lambda}{4} \cdot \frac{R_{min}}{\Delta Z_{max}}$$

where λ is the wavelength of the radar signal, $R_{min}$ is the minimum distance between radar and the target/measurement area and $\Delta Z_{max}$ the maximum elevation in the measurement area.

On the other hand, with the same accuracy $σ_φ$ in the measurement of the interferometric phase φ the greater the baseline the better the accuracy $σ_z$ n the measure of the height Z, since:

$$\sigma_z = R \cdot \frac{\lambda}{4\pi B} \cdot \sigma_\varphi$$

where R is the distance from the radar.

Figure 4:
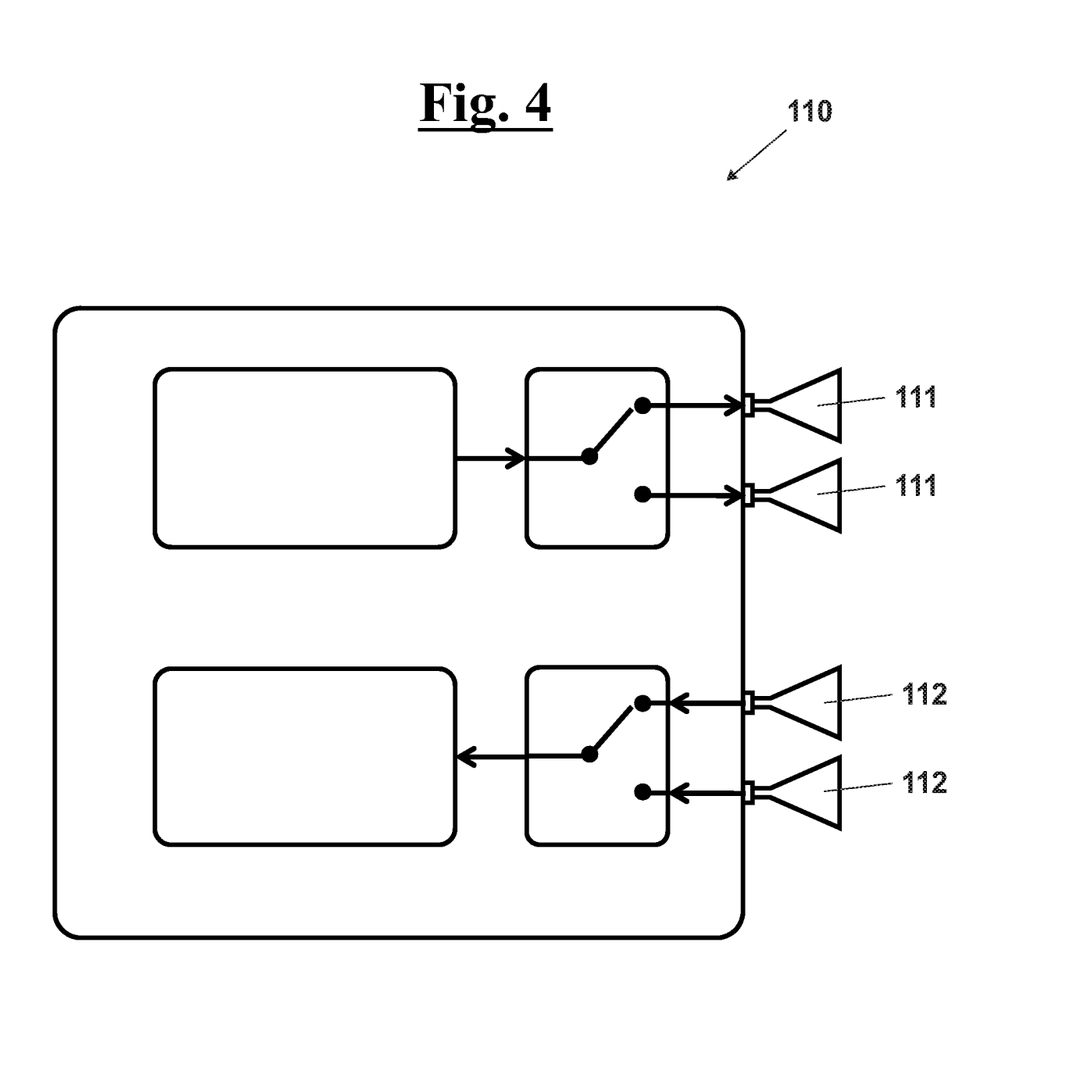
FIG. 4 diagrammatically shows a first exemplary embodiment of the radar sensor according to the present invention comprising two transmitting antennas connected alternatively to a transmission chain and two receiving antennas connected alternatively to a receiving chain.

FIG. 4 diagrammatically shows a first exemplary embodiment of the radar sensor 110, according to the present invention, comprising two transmitting antennas 111 and two receiving antennas 112, all located at different heights $h_{t1}, h_{t2}, h_{r1}, h_{r2}$. The transmitting antennas 111 are connected alternatively to a single transmission chain and, similarly, the receiving antennas 112 are connected alternatively to a receiving chain. This means that both the transmitting antennas 111 and the receiving antennas 112 operate in a non-contemporary manner. This way, it is possible to adjust the height of acquisition $h_{α1}$ of the signal according which antennas are activated, but it is not possible to provide a further height of acquisition $h_{α2} ≠ h_{α1}$ at the same time.

Figure 5:
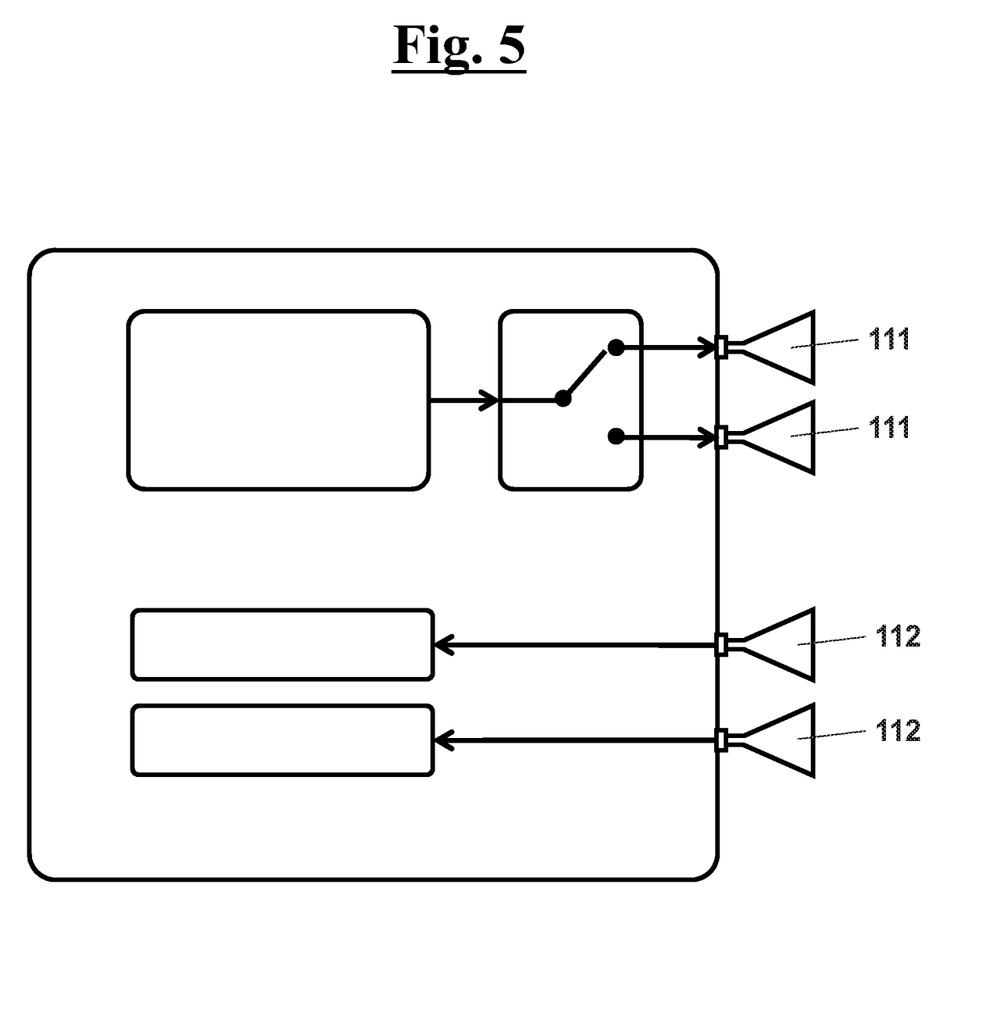
FIG. 5 diagrammatically shows a second exemplary embodiment of the radar sensor according to the present invention comprising two transmitting antennas connected alternatively to a transmission chain and two receiving antennas connected to two receiving chains arranged in parallel to each other.

FIG. 5 diagrammatically shows a second exemplary embodiment of the radar sensor 110, alternative to that one of FIG. 4, where the transmitting antennas 111 are connected alternatively to a single transmission chain whereas the receiving antennas 112 are connected to two independent chains of receiving arranged in parallel to each other. This way, it is possible to provide two different heights of acquisition $h_{α1}$ and $h_{α2}$ at the same time. In particular, both can be raised or lowered, depending, respectively, on whether the first or second transmitting antenna is selected.

Figure 6:
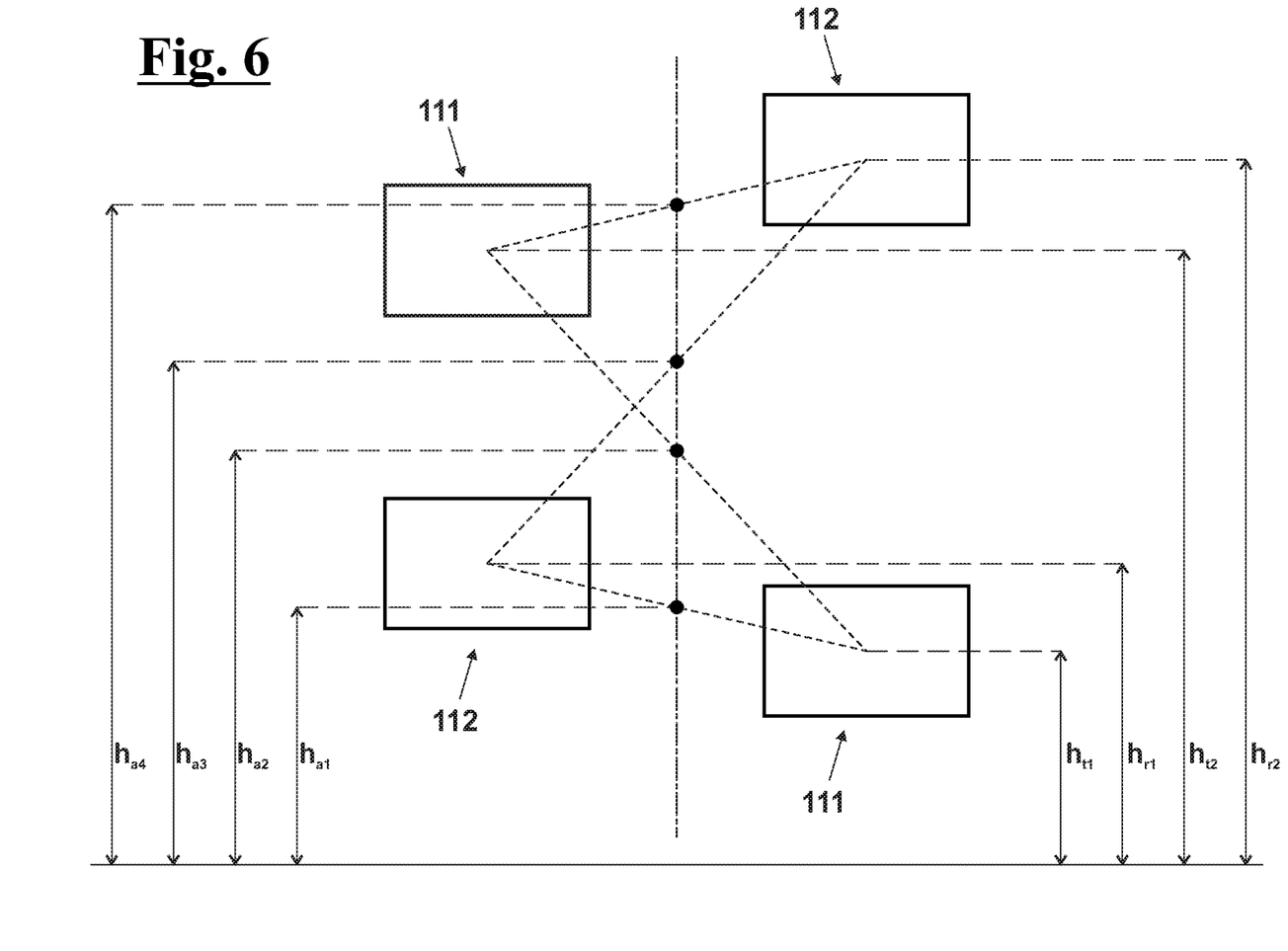
FIG. 6 diagrammatically shows a generic antenna arrangement geometry and the resulting acquisition heights in a radar sensor having two transmission antennas and two receiving antennas.

For the sake of clarity, in FIG. 6 is diagrammatically shown a possible geometry, applicable both to the first exemplary embodiment of FIG. 4 and to the second exemplary embodiment of FIG. 5, of the arrangement of the antennas and the resulting acquisition heights, in a radar sensor 110 having two transmitting antennas 111 and two receiving antennas 112.

As can be seen, by appropriately differentiating the positioning heights of the antennas, it is possible to provide up to four different heights of acquisition $h_{α4} ≠ h_{α3} ≠ h_{α2} ≠ h_{α1}$, and such heights of acquisition may vary in value both changing the values of the positioning heights of the antennas both changing the dependence of each height of acquisition by the positioning heights. Even maintaining constant the positioning heights, it is therefore possible to change the height of acquisition combining differently the positioning heights itself.

Figure 7:
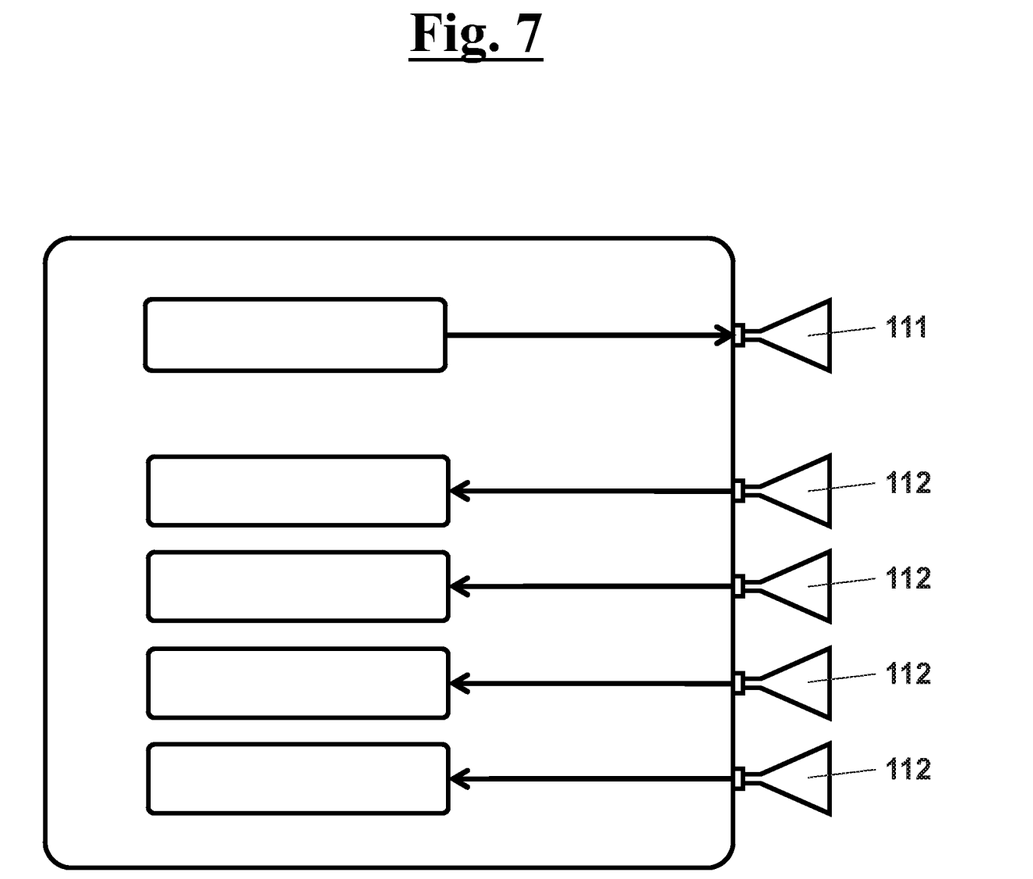
FIG. 7 diagrammatically shows a second exemplary embodiment of the radar sensor according to the present invention comprising a transmitting antenna connected to a transmission chain and four receiving antennas connected to respective four receiving chains arranged in parallel to each other.

FIG. 7 diagrammatically shows a third exemplary embodiment of the radar sensor 110, according to the present invention, comprising a transmitting antenna 111 connected to a transmission chain and four receiving antennas 112 connected to four independent receiving chains arranged in parallel to each other.

Figure 8:
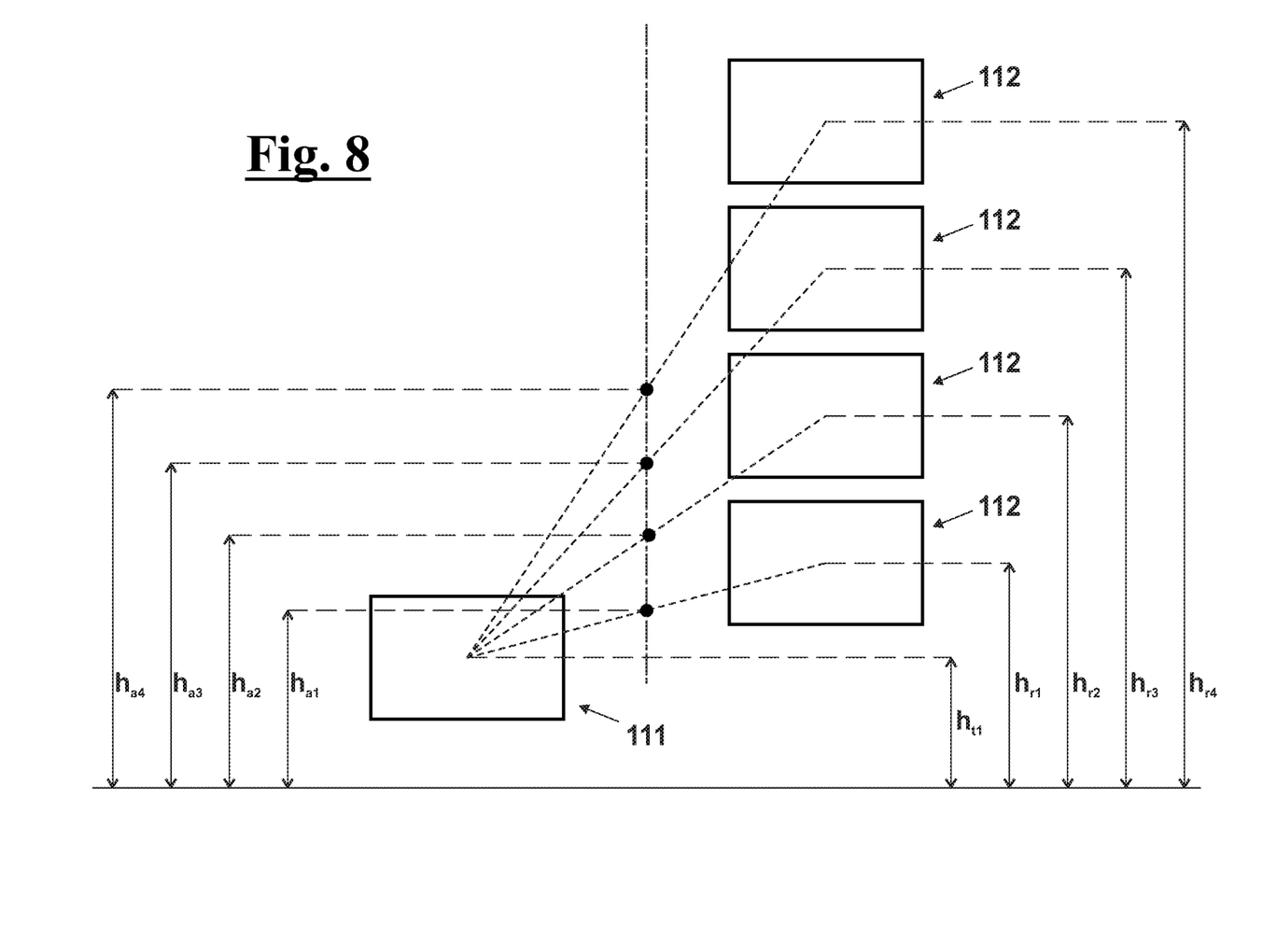
FIG. 8 diagrammatically shows a generic antenna arrangement geometry and the resulting acquisition heights in a radar sensor having a transmission antenna and four receiving antennas.

Also in this case, as shown by way of example in FIG. 8, it is possible to obtain contemporaneously up to four different heights of acquisition $h_{\alpha 4} \neq h_{\alpha 3} \neq h_{\alpha 2} \neq h_{\alpha 1}$.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. A method for monitoring surface deformations of a scenario by means of differential interferometry technique, said method comprising the steps of:
   prearranging a radar sensor comprising at least one transmitting antenna and a receiving antenna arranged to transmission and acquisition of radar signals, said radar sensor arranged to move along a planar trajectory $\gamma$ having centre O;
   defining a reference system S having origin in said centre O;
   acquiring by SAR technique said scenario by means of handling said radar sensor along said planar trajectory $\gamma$, said radar sensor being configured in such a way that the radiation pattern of said antennas is oriented radially with respect to said centre O, said acquisition occurring at points of acquisition $s_i$ arranged on said trajectory $\gamma$, obtaining a plurality of data for each point of acquisition $s_i$;
   defining a plurality of target points $t_i$ of said scenario, the three-dimensional position of each target point $t_i$ being definable by means of spherical coordinates $(\rho_i, \theta_i, \beta_i)$ referring to said reference system S, being known the values of said coordinates $\rho_i$ and $\theta_i$;
   three-dimensional determining of said target points $t_i$ by the steps of:
   focusing at a first height of acquisition $h_{\alpha 1}$ each target point $t_i$ with respect to its own position considering a value of $\beta_i$ predetermined and equal to $\beta_0$;
   focusing at a second height of acquisition $h_{\alpha 2} \neq h_{\alpha 1}$ each target point $t_i$ with respect to its own position considering a value of $\beta_i$ predetermined and equal to $\beta_0$;
   controlling, by means of interferometric technique, said focusings at the height of acquisition $h_{\alpha 1}$ and $h_{\alpha 2}$ obtaining a value of said coordinate $\beta_i$ for each target point;
   and by that a step is further provided of global focusing each target point $t_i$ with respect to its own three-dimensional position definable by said spherical coordinates $(\rho_i, \theta_i, \beta_i)$, obtaining a first focused radar datum, said step of focusing being obtained, for each target point $t_i$, by analyzing data obtained at each point of acquisition $s_i$ wherein said target point $t_i$ is detectable.

2. The method according to claim 1, wherein downstream of said step of global focusing, is provided a reiteration of said steps of:
   acquiring by means of SAR technique said scenario;
   global focusing each target point $t_i$, obtaining a second focused radar datum;
   and where a step is then provided of comparing said first and second focused datum by means of differential interferometry technique, in order to monitor the variation of said scenario and to measure its deformation.

3. The method according to claim 1, wherein downstream of said step of three-dimensional determining of said target points $t_i$ a step is provided of simplifying said plurality of target points $t_i$ of said scenario, said step of simplifying providing the steps of:
   selecting, in said plurality of target points $t_i$, target points $t_i$ having identical values of $\theta_i$, obtaining a subgroup of said target points $t_i$;
   arranging target points $t_i$ in said subgroup for increasing values of $\rho_i$, obtaining an ordered succession of target points $t_i$ of said subgroup;
   attributing a same value of $\beta_i$ to target points $t_i$ of said subgroup selected by means of isotonic regression technique according to said ordered succession.

4. The method according to claim 1, wherein said step of three-dimensional determining of said target points $t_i$ is made by said radar sensor.

5. The method according to claim 4, wherein said step of three-dimensional determining of said target points $t_i$ is made by at least one transmitting antenna and at least two receiving antennas having heights of location, respectively, $h_{t1}$, $h_{r1}$, $h_{r2}$, with $h_{r1} \neq h_{r2}$, said first height of acquisition $h_{\alpha 1}$ and said second height of acquisition $h_{\alpha 2} \neq h_{\alpha 1}$ being a function of said heights of location $h_{t1}$, $h_{r1}$, $h_{r2}$ according to the equations:

$$h_{\alpha 1} = \frac{h_{t1} + h_{r1}}{2}$$

$$h_{\alpha 2} = \frac{h_{t1} + h_{r2}}{2}.$$

6. The method according to claim 4, wherein said step of three-dimensional determining of said target points $t_i$ is made by at least two transmitting antennas and a receiving antenna having heights of location, respectively, $h_{t1}$, $h_{t2}$, $h_{r1}$, with $h_{t1} \neq h_{t2}$, said first height of acquisition $h_{\alpha 1}$ and said second height of acquisition $h_{\alpha 2} \neq h_{\alpha 1}$ being a function of said heights of location $h_{t1}$, $h_{t2}$, $h_{r1}$ according to the equations:

$$h_{\alpha 1} = \frac{h_{t1} + h_{r1}}{2}$$

$$h_{\alpha 2} = \frac{h_{t2} + h_{r1}}{2}.$$

7. The method according to claim 4, wherein said radar sensor comprises two transmitting antennas and two receiving antennas having heights of location, respectively, $h_{t1}$, $h_{t2}$, $h_{r1}$, $h_{r2}$, and wherein said step of three-dimensional tracking of said target points $t_i$ furthermore comprises the steps of:
   focusing at a third height of acquisition $h_{\alpha 3} \neq h_{\alpha 2} \neq h_{\alpha 1}$ each target point $t_i$ with respect to its own position considering a value of $\beta_i$ predetermined and equal to $\beta_0$;
   focusing at a fourth height of acquisition $h_{\alpha 4} \neq h_{\alpha 3} \neq h_{\alpha 2} \neq h_{\alpha 1}$ each target point $t_i$ with respect to its own position considering a value of $\beta_i$ predetermined and equal to $\beta_0$;
said heights of acquisition being a function of said heights of location $h_{t1}$, $h_{t2}$, $h_{r1}$, $h_{r2}$ according to the equations:

$$h_{a1} = \frac{h_{t1} + h_{r1}}{2}$$

$$h_{a2} = \frac{h_{t1} + h_{r2}}{2}$$

$$h_{a3} = \frac{h_{t2} + h_{r1}}{2}$$

$$h_{a4} = \frac{h_{t2} + h_{r2}}{2}.$$

8. The method according to claim 4, wherein said radar sensor comprises a transmitting antenna and four receiving antennas having heights of location, respectively, $h_{r1}$, $h_{r1}$, $h_{r2}$, $h_{r3}$, $h_{r4}$, with $h_{r1} \neq h_{r2} \neq h_{r3} \neq h_{r4}$, and wherein said step of three-dimensional determining of said target points $t_i$ also comprises the steps of:

focusing at a third height of acquisition $h_{\alpha 3} \neq h_{\alpha 2} \neq h_{\alpha 1}$ each target point $t_i$ with respect to its own position considering a value of $\beta_i$ predetermined and equal to $\beta_0$;

focusing at a fourth height of acquisition $h_{\alpha 4} \neq h_{\alpha 3} \neq h_{\alpha 2} \neq h_{\alpha 1}$ each target point $t_i$ with respect to its own position considering a value of $\beta_i$ predetermined and equal $\beta_0$;

said heights of acquisition being a function of said heights of location $h_{t1}$, $h_{r1}$, $h_{r2}$, $h_{r3}$, $h_{r4}$ according to the equations:

$$h_{a1} = \frac{h_{t1} + h_{r1}}{2}$$

$$h_{a2} = \frac{h_{t1} + h_{r2}}{2}$$

$$h_{a3} = \frac{h_{t1} + h_{r3}}{2}$$

$$h_{a4} = \frac{h_{t1} + h_{r4}}{2}$$

9. A method for monitoring surface deformations of a scenario by means of differential interferometry technique, said method comprising the steps of:

prearranging a radar sensor comprising at least one transmitting antenna and one receiving antenna arranged to acquire of radar signals, said radar sensor arranged to move along a planar trajectory γ having centre O;

defining a reference system S having origin in said centre O;

acquiring by SAR technique said scenario by means of handling said radar sensor along said planar trajectory γ, said radar sensor being configured in such a way that the radiation pattern of said antennas is oriented radially with respect to said centre O, said acquisition occurring at points of acquisition $s_i$ arranged on said trajectory γ, obtaining a plurality of data for each point of acquisition $s_i$;

defining a plurality of target points $t_i$ of said scenario, the three-dimensional position of each target point $t_i$ being definable by means of spherical coordinates $(\rho_i, \theta_i, \beta_i)$ referring to said reference system S, being known the values of said coordinates $\rho_i$ and $\theta_i$;

acquiring a three-dimensional mapping of said scenario, said mapping comprising a cloud of highlights $\rho_i$ arranged to define a three-dimensional surface Σ superimposable to said scenario, each highlight $\rho_i$ definable by means of spherical coordinates $(\rho_k, \theta_k, \beta_k)$ referring to said reference system S;

three-dimensional determining said target points $t_i$ by means of intersection, for each target point $t_i$, between said three-dimensional surface Σ and the locus of points having the coordinates $\rho_i$ and $\theta_i$ of said target point $t_i$, obtaining a value of $\beta_i$ for each target point $t_i$;

global focusing each target point $t_i$ with respect to its own three-dimensional position definable by said spherical coordinates $(\rho_i, \theta_i, \beta_i)$, said step of focusing being obtained, for each target point $t_i$, by analyzing data obtained at each point of acquisition $s_i$ wherein said target point $t_i$ is detectable.

10. An apparatus for monitoring surface deformations of a scenario by means of differential interferometry technique, said apparatus comprising:

a radar sensor comprising at least one transmitting antenna and one receiving antenna arranged to acquire radar signals;

a kinematical chain arranged to actuate said radar sensor along a planar trajectory γ having centre O for carrying out an acquisition by means of SAR technique of said scenario, said radar sensor being configured in such a way that the radiation pattern of said antennas is oriented radially with respect to said centre O, said acquisition occurring at points of acquisition $s_i$ arranged on said trajectory γ, obtaining a plurality of data for each point of acquisition $s_i$;

a control unit arranged to provide the steps of:

defining a plurality of target points $t_i$ of said scenario, the three-dimensional position of each target point $t_i$ being definable by means of spherical coordinates $(\rho_i, \theta_i, \beta_i)$ referring to said reference system S, being known the values of said coordinates $\rho_i$ and $\theta_i$, said focusing comprising the steps of:

three-dimensional determining said target points $t_i$ by the steps of:

focusing at a first height of acquisition $h_{\alpha 1}$ each target point $t_i$ with respect to its own position considering a value of A predetermined and equal to $\beta_0$;

focusing at a second height of acquisition $h_{\alpha 2} \neq h_{\alpha 1}$ each target point $t_i$ with respect to its own position considering a value of $\beta_i$ predetermined and equal to $\beta_0$;

controlling said focusings at the heights of acquisition $h_{\alpha 1}$ and $h_{\alpha 2}$ obtaining a value of said coordinate $\beta_i$ for each target point;

wherein said control unit is also arranged for carrying out a step of global focusing each target point $t_i$ with respect to its own three-dimensional position definable by said spherical coordinates $(\rho_i, \theta_i, \beta_i)$, said step of focusing being obtained, for each target point $t_i$, by analyzing data obtained at each point of acquisition $s_i$ wherein said target point $t_i$ is detectable.

11. The apparatus according to claim 10, wherein said radar sensor comprises at least one transmitting antenna and at least two receiving antennas having heights of location, respectively, $h_{t1}$, $h_{r1}$, $h_{r2}$, with $h_{r1} \neq h_{r2}$, said first height of acquisition $h_{\alpha 1}$ and said second height of acquisition $h_{\alpha 2} \neq h_{\alpha 1}$ being a function of said heights of location $h_{t1}$, $h_{r1}$, $h_{r2}$ according to the equations:

$$h_{a1} = \frac{h_{t1} + h_{r1}}{2}$$

-continued $$h_{a2} = \frac{h_{t1} + h_{r2}}{2}$$

wherein $$\frac{\lambda}{10} < |h_{a1} - h_{a2}| < 40\lambda,$$

where γ is the wavelength of the radiofrequency signal emitted by said radar sensor.

12. The apparatus according to claim 10, wherein said radar sensor comprises at least two transmitting antennas and a receiving antenna having heights of location, respectively, $h_{t1}$, $h_{t2}$, $h_{r1}$, with $h_{t1} \neq h_{t2}$, said first height of acquisition $h_{\alpha 1}$ and said second height of acquisition $h_{\alpha 2} \neq h_{\alpha 1}$ being a function of said heights of location $h_{t1}$, $h_{t2}$, $h_{r1}$ according to the equations:

$$h_{a1} = \frac{h_{t1} + h_{r1}}{2}$$

$$h_{a2} = \frac{h_{t2} + h_{r1}}{2}$$

wherein $$\frac{\lambda}{10} < |h_{a1} - h_{a2}| < 40\lambda,$$

where γ is the wavelength of the radiofrequency signal emitted by said radar sensor.

13. The apparatus according to claim 10, wherein said radar sensor comprises two transmitting antennas and two receiving antennas having heights of location, respectively, $h_{t1}$, $h_{t2}$, $h_{r1}$, $h_{r2}$ and wherein said step of three-dimensional determining of said target points $t_i$ furthermore comprises the steps of:

focusing at a third height of acquisition $h_{\alpha 3} \neq h_{\alpha 2} \neq h_{\alpha 1}$ each target point $t_i$ with respect to its own position considering a value of $\beta_i$ predetermined and equal to $\beta_0$;

focusing at a fourth height of acquisition $h_{\alpha 4} \neq h_{\alpha 3} \neq h_{\alpha 2} \neq h_{\alpha 1}$ each target point $t_i$ with respect to its own position considering a value of $\beta_i$ predetermined and equal to $\beta_0$;

said heights of acquisition being a function of said heights of location $h_{t1}$, $h_{t2}$, $h_{r1}$, $h_{r2}$ according to the equations:

$$h_{a1} = \frac{h_{t1} + h_{r1}}{2}$$

$$h_{a2} = \frac{h_{t1} + h_{r2}}{2}$$

$$h_{a3} = \frac{h_{t2} + h_{r1}}{2}$$

$$h_{a4} = \frac{h_{t2} + h_{r2}}{2}$$

wherein $|h_\alpha - h_{\alpha 4}| > |h_{\alpha 2} - h_{\alpha 3}|$.

14. The apparatus according to claim 13, wherein $h_{t1} = h_{r1}$ and $h_{t2} \neq h_{r1}$ and $h_{t2} \neq h_{r2}$.

15. The apparatus according to claim 10, wherein said radar sensor comprises a transmitting antenna and four receiving antennas having heights of location, respectively, $h_{t1}$, $h_{r1}$, $h_{r2}$, $h_{r3}$, $h_{r4}$, with $h_{r1} \neq h_{r2} \neq h_{r3} \neq h_{r4}$, and wherein said step of three-dimensional determining of said target points $t_i$ also comprises the steps of:

focusing at a third height of acquisition $h_{\alpha 3} \neq h_{\alpha 2} \neq h_{\alpha 1}$ each target point $t_i$ with respect to its own position considering a value of $\beta_i$ predetermined and equal to $\beta_0$;

focusing at a fourth height of acquisition $h_{\alpha 4} \neq h_{\alpha 3} \neq h_{\alpha 2} \neq h_{\alpha 1}$ each target point $t_i$ with respect to its own position considering a value of $\beta_i$ predetermined and equal to $\beta_0$;

said heights of acquisition being a function of said heights of location $h_{t1}$, $h_{r1}$, $h_{r2}$, $h_{r3}$, $h_{r4}$ according to the equations:

$$h_{a1} = \frac{h_{t1} + h_{r1}}{2}$$

$$h_{a2} = \frac{h_{t1} + h_{r2}}{2}$$

$$h_{a3} = \frac{h_{t1} + h_{r3}}{2}$$

$$h_{a4} = \frac{h_{t1} + h_{r4}}{2}.$$

* * * * *